United States Patent Office 3,265,772
Patented August 9, 1966

3,265,772
CROSS-LINKED BLENDED POLYMERS CONTAINING POLYMERIC ACRYLOXY BENZOPHENONES
Stanley Tocker, Wilmington, Del., assignor to E. I. du Pont de Nemours and Company, Wilmington, Del., a corporation of Delaware
No Drawing. Filed Sept. 28, 1962, Ser. No. 227,066
11 Claims. (Cl. 260—898)

The present invention concerns the improvement of polymeric materials; particularly polymers of polar vinyl monomers which are more accurately called "polar vinylidene monomers."

By "polar vinylidene monomers" are meant monomers having at least one polar group, e.g. an acetoxy group, acetyl group, cyano group, a halide group, a carboxyamide group, a carboalkoxy group, etc. They are specifically covered by the formula:

wherein $R^1$ is selected from one of the following groups:

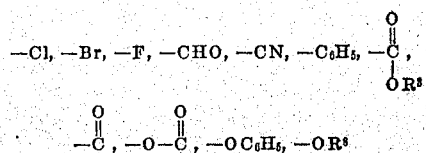

and

wherein $R^3$ and $R^4$ are each selected from the group consisting of alkyl and —H, $R^8$ is alkyl; and wherein $R^2$ is selected from the group consisting of $R^1$, —H and alkyl of 1-4 carbon atoms.

The most useful polar vinylidene monomers fall within the general formula:

wherein $R^5$ is selected from the group consisting of —Cl, —Br, —F, —H and alkyl of 1-4 carbon atoms.

Polymers and copolymers of polar vinylidene monomers, because of their adaptability to economical modes of manufacture and because of their outstanding physical properties are ideally suited for a great variety of industrial end uses. However, inherent in all these materials to varying extents, are disadvantages which tend to limit their utilization. Among these limitations, one or more which are shared by these materials, are poor dimensional stability, limpness, low resistance to grease and oil, high electrostatic susceptibility, susceptibility to solvent actions and low zero strength temperature.

Attempts have been made to improve these properties by means of cross-linking, utilizing such methods as chemical reaction with peroxides, treatment with ultraviolet light, ultraviolet light plus a sensitizer, and by bombardment with electrons. Very often, however, these methods prove to be ineffective or impractical for a variety of reasons e.g. difficulty of incorporating free radical generating additives into relatively infusible materials, non-stability to heat of the products' intermediates, exudation of the photosensitive additive, non-homogeneous mixing of the additive in the polymer, etc. As an example of a typical problem in cross-linking is an intractable polymer such as polyacrylonitrile; attempts to blend additives with it on polymer melting equipment such as a Banbury or rubber mill, lead to decomposition.

It is an object of this invention, therefore, to provide improved polymeric materials, particularly polar vinylidene polymers. It is a further object of this invention to provide photocross-linked polymers of polar vinylidene compounds which exhibit (1) enhanced physical properties, (2) are capable of being formed into shaped structures capable of being coated or laminated to materials of dissimilar nature, and (3) are readily receptive to the grafting of dissimilar polymeric materials on the surface thereof. It is a still further object to provide photocross-linked polymers of polar vinylidene compounds which can be processed to shaped structures without premature cross-linking or volatization of the photosensitizer and which can be subsequently photocross-linked under relatively mild controlled reaction conditions. It is a still further object to provide polymers of polar vinylidene compounds having blended therewith a polymeric photosensitizer which when subsequently photocross-linked, (1) does not tend to exude from the polymeric composition, (2) exhibits a relatively low vapor pressure, and (3) is not removed during processing at elevated temperatures.

This invention provides a relatively simple means for cross-linking polymers of polar vinylidene monomers and for grafting other monomeric materials to such polymers in order to obtain properties heretofore unobtainable in such polymers. For example, cross-linking when performed according to the present invention can be used to improve dimensional stability of shaped articles made from the polymers; to increase the resistance of the articles formed to permanent stress deformation; to reduce the permeability of such articles, e.g. films and the like, to grease and oil; to increase the resistance of the polymeric articles to common organic solvents; and to increase the low temperature strength of such polymeric articles. Grafting, when performed according to the present invention, can be used to improve the physical properties mentioned above, and, in addition, can be used to make normally intractable polymers tractable.

The means for cross-linking such polymers and for grafting other monomeric materials to such polymers comprises first intimately blending a polymer of a polar vinylidene monomer as defined above with 0.01 to 10 mole percent, preferably 0.1 to 10 mole percent of a polymer prepared from a photosensitizing compound of the formula:

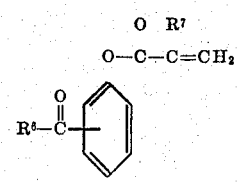

wherein $R^6$ is selected from the group consisting of methyl and phenyl, and $R^7$ is selected from the group consisting of methyl and —H; and( thereafter exposing the blended components, preferably after forming components into a shaped article, e.g. a film, filament, tube, rod, etc., to radiation having a wave length of 2,000–7,000 A. preferably 2,000–5,000 A., for a time sufficient to insolubilize the intimate blend of components in an organic solvent in which it is normally soluble without degrading the components.

The lack of degradation is shown by no increase in infrared absorption in the 1650 to 1775 cm.$^{-1}$ region. Insolubilization is usually determined by noting the progressive precipitation of the blended components in the solvent used during blending as cross-linking of the blend progresses.

The product involves a covalent union of the photosensitizing polymer and the major polymeric component after exposure to light. The two polymers can no longer be separated by solvent extraction.

The grafting process is substantially the same as that given above for cross-linking except that exposure to radiation is carried out in the presence of the "other monomeric material," which monomeric material has the formula:

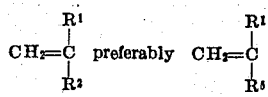

wherein $R^1$, $R^2$ and $R^5$ are as defined previously.

The preferred polar vinylidene monomers for subsequent polymerization, blending with the polymeric photosensitizer and cross-linking, and the preferred monomeric materials for grafting are: vinyl acetate, vinyl chloride, methyl acrylate, acrylonitrile, vinylidene chloride. However, these monomers may be selected from quite a large group as follows: vinylidene chloride, vinylidene fluoride, methyl, ethyl, isobutyl, butyl, octyl, and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate, and the corresponding esters of acrylic acid; methyl alphachloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl butyrate, vinyl chloroacetate, vinyl bromide, styrene, vinyl naphthalene, methyl vinyl ether, ethyl vinyl ether, isopropyl vinyl ether, n-butyl vinyl ether, isobutyl vinyl ether, N-vinyl phthalimide, N-vinyl succinimide, N-vinyl carbazole, isopropenyl acetate, methylene diethyl malonate, acrolein, methacrolein, acrylamide, methacrylamide or monoalkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ethyl and other unsaturated aliphatic ethers described in U.S. Patent 2,160,943.

The sensitizing homopolymer is prepared from monomer substances characterized by having an acrylic ester group attached to a benzophenone or acetophenone radical. It should be understood that other groups, e.g. allyl, alkoxy, halogen etc. may be substituted on the benzene rings of the benzophenone structure or the one benzene ring of the acetophenone structure. Such di-, tri-, etc., substituted compound should be considered to be within the scope of the definition of the monomers employed in the preparation of the photosensitizing polymers.

The process for preparing the homopolymer involves subjecting the monomers, preferably in a solvent such as hexane, benzene, toluene, tetrachloroethylene, dimethylsulfoxide, etc., to a temperature of —40° to 300° C. and a pressure of 1–3,000 atmospheres in the presence of a catalyst for a contact time sufficient to form the homopolymer, usually at least 20 seconds for a continuous process and at least 3 minutes for a batch process, and then isolating the resulting homopolymer.

When high pressures are used, 800 atmospheres and above, a conventional peroxide (di-tertiary butyl peroxide) or azo catalyst (alpha, alpha'-azobisdicyclohexanecarbonitrile) may be used and the temperature is preferably 25°–175° C.

It is believed that the essential feature of this type of catalyst, or more properly termed "initiator," is that it is capable of generating free radicals. These free radical initiators, whether they be generated from a peroxide compound or from an azo-type compound, combine with a polymerizable monomer to form a new free radical; the new free radical combines with another monomer molecule to form still another free radical; this process is repeated until there is propogated a long polymer chain. Polymer chain growth terminates when the free radical-bearing polymer fragment encounters another free radical which, for example, may be another growing polymer chain or an initiator free radical.

Typical peroxides which release free radicals to function as initiators include benzoyl peroxide, di-tertiarybutyl peroxide, tertiary-butyl peracetate, di-tertiary-butyl peroxydicarbonate, 2,2-bis(tertiarybutylperoxy) butane, dimethyl dioxide, diethyl dioxide, dipropyl dioxide, propyl ether dioxide and propyl methyl dioxide. Organic hydroperoxides are also applicable. For example, tertiarybutylhydroperoxide, cumene hydroperoxide, ethyl hydroperoxide, can be used to initiate polymerizations of this kind. Combinations such as ammonium persulfate with a reducing agent can also be used.

Typical azo compounds which decompose to liberate free radicals for initiation of polymerization include such catalysts as alpha,alpha'-azobisdicyclohexanecarbonitrile, alpha,alpha'-azobisisobutyronitrile, triphenylmethylazobenzene, 1,1'-azodicycloheptanecarbonitrile, alpha,alpha'-azobisisobutyramide, lithium azodisulfonates, magnesium azodisulfonate, dimethyl alpha,alpha'-azodiisobutyrate, alpha,alpha'-azobis (alpha,gamma-dimethylvaleronitrile) and alpha,alpha'-azobis (alpha,beta - dimethylbutyronitrile).

As stated previously, polymerization is preferably carried out in a solvent medium. Among the solvents which have been found useful in the present invention are hydrocarbons and the halogenated hydrocarbons: hexane, benzene, toluene, cyclohexane, bromobenzene, chlorobenzene, o-dichlorobenzene, tetrachloroethylene, dichloromethane and 1,1,2,2-tetrachloroethane. Heterocyclic compounds such as tetrahydrofuran, thiophene and dioxane may also be used. The preferred solvents are the nonpolar and aromatic solvents, e.g. benzene, hexane, cyclohexane, dioxane, etc. In some instances, polymerization may be effected without a solvent or in an emulsion or slurry system.

The photosensitizing homopolymer prepared from the substituted benzophenone or acetophenone should be intimately blended with the polar vinylidene polymer. This may be accomplished by thoroughly admixing the two polymeric substances in a mixing device (Banbury mixer), or by the dissolution in a solvent compatible to both materials.

The ratio of the photosensitizing homopolymer to the polar vinylidene compound should be such that the final blend is composed of at least 0.01 mole percent, preferably at least 0.1 mole percent, of the sensitizing homopolymer, the remainder being the other polymer or polymers. Less than 0.1 percent of the stabilizer does not provide sufficient sites for cross-linking or grafting in the subsequent radiation step. Ten mole percent seems to be an adequate maximum of sensitizing homopolymer in the polymer blend. More than 10 mole percent does not provide sufficient improvement to warrant the use of the relatively expensive sensitizing homopolymer.

In the following discussion, the method of cross-linking the resulted polymeric blend is discussed. However, it should be understood that the grafting procedure is identical except that the exposure of the polymeric blend to radiation occurs in the presence of monomer and the grafting may require greater exposure. The amount of graftable monomer may be very small to as high as 50 wt. percent of the mixture or higher. Thus, in generic terms, the polymeric blend prepared in the previous step may be subjected to radiation in the presence of the graftable monomer and either cross-linking (when zero wt. percent of the monomer is present), grafting or both will occur. In cases where the graftable monomer or a solution thereof will not permeate the polymer-sensitizer blend, grafting will take place primarily at the surface while cross-linking will be the primary reaction inside the polymer blend. Thus, considerable latitude is afforded by the choice of solvent, monomer, and base polymer in providing products with an enormous range of properties.

Specifically, the composition in its basic form or preferably, in the form of a shaped article, e.g. film, filament, pipe, rod, etc., is subjected to radiation having a wave length of 2,000 to 7,000 A. The manner of subjecting the material to radiation may involve exposure to high energy xenon radiation, to sunlamps such as the 1,000 watt General Electric AH-6 or to ordinary sunlight. The period of exposure required will depend on the method used. Thus, xenon radiation for a fraction of a second, sunlamps for a period of one second to about 30 minutes depending upon the distance between lamp and material to be irradiated, and sunlight for a period of five minutes to several hours all serve the purpose. The amount of exposure should be sufficient to cross-link the polymeric blend without degrading it.

Cross-linking is determined by noting the change in solubility of the composition. Thus, the acrylate and vinyl ester polymeric blends which are normally soluble in benzene at about 80° C. become insoluble after cross-linking. Similarly, the vinylidene chloride-acrylate polymeric blends which are normally soluble in tetrahydrofurane at about 60° C., or in ortho-dichlorobenzene at about 130° C. become insoluble in these same solvents upon crosslinking. And polyacrylonitrile acrylate blends, soluble in dimethyl formamide at about 60° C., becomes insoluble after cross-linking.

The maximum exposure to radiation is limited by the necessity to prevent degradation. Degradation is usually in the form of oxidative and chain cleavage of the composition and is accompanied by discoloration and a marked deterioration in the physical properties of the composition. Degradation is determined by infrared analysis in accordance with the following theory. It has been noted that photocross-linking is accompanied by reduction in carbonyl absorption. This would indicate that cross-linking is produced by the reaction of the photo-excited aromatic groups of the units in the polymeric blend obtained from the photosensitive homopolymer. However, oxidation would lead to the formation of groups such as aldehyde groups, ketone groups, carboxyl groups, etc. These would be detected by an increase in the infrared absorption in the 1650–1775 cm.$^{-1}$. By forming the polymeric blend first, as in the process of the present invention, the conditions for cross-linking can be sufficiently mild and substantially avoid any oxidative side reactions.

It should be understood that the compositions undergoing exposure to radiation, either in their basic form or in the form of shaped articles, may contain, besides the critical blend of polymers of the polymeric polyvinylidene compound with the photosensitizing homopolymer, dyes, fillers, pigments, plasticizers, slip agents, anti-static agents, etc. As long as the addtives themselves are not adversely affected by radiation or do not adversely effect the composition being cross-linked, then it is intended that such compositions containing additives also be treated in accordance with the process of this invention.

It should be noted that the polymeric shaped articles such as the self-supporting films, filaments, etc. can be formed from the polymeric blends using standard procedures. These procedures may involve temperatures as high as 300° C. or higher. The presence of the thermally stable substituted benzophenone or acetophenone groups in the blend with the polar vinylidene polymer does not effect the thermal stability of the polymeric blend to any substantial degree. This represents an improvement over the use of peroxide or azo additives which are commonly used for heat-induced cross-linking. The use of peroxide or azo additives tends to cause a premature cross-linking when processing occurs at high temperature. This tends to restrict their use to low molecular weight, high-flow resins and to resins where the molding temperature is below 175° C.

It should also be noted that the polymeric blends can be treated in accordance with the present invention in the form of large shaped articles. This results from the fact that very high energy radiation which involves radiation as a narrow beam is not necessary for cross-linking. Thus, the large articles can be cross-linked by merely exposing them to sunlight.

The resulting articles, after cross-linking or grafting, can be used whenever good physical properties and chemical properties are desirable. Thus, the self-supporting films are useful as containers for potato chips and bacon rinds where high oil and grease resistance is required. The films are also useful as protective sheeting and industrial construction and may be used to photo-reproduction processes.

The invention will be more clearly understood by referring to the examples which follow.

The preparation of the photosensitive monomers e.g., 2-acryloxybenzophenone, from which the polymeric photosensitive compounds blended with the polar vinylidene polymers are prepared, may be found described in detail in my copending U.S. patent application, now abandoned, Serial No. 182,929, filed March 27, 1962.

The polar vinylidene polymers were prepared by carrying out the polymerization of the respective monomer in a solution of a suitable solvent in the presence of α,α'-azobisisobutyronitrile. Exposure of all samples was carried out at a distance of 3 inches from a General Electric AH-6 lamp.

*Examples 1–8*

The following solution was heated at reflux under nitrogen for one hour:

| | |
|---|---|
| Benzene, ml. | 70 |
| 4-methacryloxybenzophenone, g. | 30 |
| α,α'-Azobisisobutyronitrile, g. | 0.1 |

1.0 ml. of the resultant viscous polymer solution was then mixed with a solution of 10 g. of polyvinyl acetate in 90 ml. benzene and 10 ml. of the resultant solution was evaporated on a glass plate (coating A). The coating was heated in a vacuum oven at 50° C. until residual solvent was removed, giving 0.25–0.50 mil. thick films. A control coating was also prepared by evaporating 10 ml. of the polyvinyl acetate solution on a glass plate (coating B). Both coatings were then exposed to a General Electric AH-6 lamp at a distance of 3″ for 30 seconds. Coating A (the photosensitive polymer blend) was insoluble in benzene, i.e. photocross-linked. Coating B (the control coating) was readily dissolved by benzene.

Where 2.0 ml. of the photosensitizing solution was used in admixture with the polyvinyl acetate solution, photocross-linking occured in 18 seconds indicating that the rate of cross-linking is dependent to a large extent on the concentration of polymeric photosensitizer.

In a similar fashion, polymers of other photosensitizing monomers were prepared, using benzene as a solvent and α,α'-azobisisobutyronitrile as catalyst. These monomers are listed below along with the minimum time to achieve photocross-linking, after polymerization and blending with polyvinyl acetate as in Example 1.

| | Seconds |
|---|---|
| Example 2—2-methacryloxybenzophenone | 5 |
| Example 3—2-acryloxybenzophenone | 15 |
| Example 4—4-acryloxybenzophenone | 25 |
| Example 5—2-acryloxyacetophenone | 25 |
| Example 6—2-methacryloxyacetophenone | 25 |
| Example 7—4-acryloxyacetophenone | 30 |
| Example 8—4-methacryloxyacetophenone | 30 |

None of the exposed blends showed increased infrared absorption between 1650–1775 cm.$^{-1}$ indicating that oxidation did not accompany cross-linking.

*Example 9*

The poly(4-methacryloxybenzophenone) solution of Example 1 was evaporated and 0.2 g. of the solid was mixed with a solution of 10 g. of polyacrylonitrile in 90 ml. dimethylsulfoxide. The resultant solution was evaporated on a glass plate (coating A). A control coating was also prepared by evaporating 10 ml. of the polyacrylonitrile solution on a glass plate (coating B). Both coatings were then exposed to a General Electric AH–6 lamp at a distance of 3″ for 15 seconds. Coating A (the photosensitive polymer blend) was insoluble in dimethylsulfoxide; coating B (control coating) was readily dissolved in dimethylsulfoxide.

*Examples 10–14*

Films 0.25–0.50 mil thick were prepared by blending 1.0 mole percent of poly(4-methacryloxybenzophenone) with the polymers listed below in a manner similar to that described in Example 1. The minimum times for crosslinking are tabulated below:

| Example | Major Polymer | Co-solvent used in blending, casting into film form, and solubility test | Time to achieve cross-linking, seconds |
|---|---|---|---|
| 10 | Poly(vinyl chloride) | Dioxane | 15 |
| 11 | Poly(methyl acrylate) | Toluene | 15 |
| 12 | Poly(vinylidene chloride) | Trichlorobenzene | 25 |
| 13 | Poly(methyl methacrylate) | Toluene | 25 |
| 14 | Poly(methyl vinyl ketone) | Toluene | 14 |

None of the polymer samples showed increased absorption in the 1650–1775 cm.$^{-1}$ infrared region, indicating that oxidation did not occur during the photocross-linking process. In no case was poly(4-methacryloxybenzophenone) lost from the polymer by evaporation or exudation.

*Example 15*

A polyvinyl acetate blend containing 1.0 mole percent of the poly(4-methacryloxybenzophenone) as prepared in Example 1 was soaked in acrylonitrile monomer overnight. The resultant coating was exposed to a General Electric AH–6 lamp under nitrogen at a distance of 3″ for 5 minutes. The product showed nitrile (C≡N) infrared absorption at 2100–2300 cm.$^{-1}$ and a weight increase of 30% was observed. Extraction with dimethyl sulfoxide did not reduce the weight significantly or eliminate the infrared nitrile absorption at 2100–2300 cm.$^{-1}$ thus indicating the formation of an acrylonitrile graft.

The photosensitive polymers prepared by the process of the present invention are not encumbered by any of the following limitations:

(1) Necessity for the inclusion of an exudable additive.
(2) A post reaction to add the photosensitive group.
(3) Non-heat-stability of the products and intermediates.
(4) Necessity for a copolymerization step with the necessity for careful regulation of monomer streams and reactivity ratios.
(5) Change in crystallinity of the polymer.

Furthermore, these photosensitive polymers lend themselves readily to surface grafting of other monomeric materials which are not readily graftable by other processes, i.e. acrylonitrile. Such graft-polymer blend compositions are extremely resistant to the attack of organic solvents.

Having fully disclosed the invention, what is claimed is:

1. A cross-linked polymeric composition comprising a blend of a polymer of at least one polar vinylidene monomer having the formula

wherein R$^1$ is selected from one of the following groups:

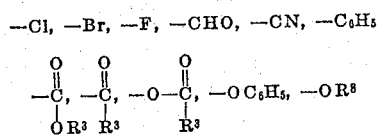

and

wherein R$^3$ and R$^4$ are each selected from the group consisting of alkyl and —H, R$^8$ is alkyl; and
wherein R$^2$ is selected from the group consisting of R$^1$, —H and alkyl of 1–4 carbon atoms;
and at least 0.01 mole percent of a polymer of a monomer

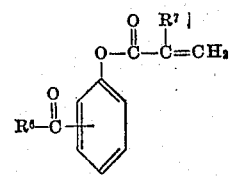

wherein
R$^6$ is selected from the group consisting of methyl and phenyl, and
R$^7$ is selected from the group consisting of methyl and —H;
characterized by its insolubility in a solvent in which the first homopolymer, prior to cross-linking, was soluble.

2. A cross-linked polymeric composition comprising a blend of a polymer of at least one polar vinylidene monomer having the formula

wherein R$^1$ is selected from one of the following groups:

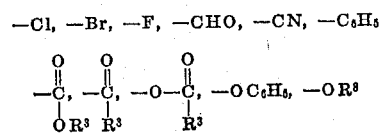

and

wherein R$^3$ and R$^4$ are each selected from the group consisting of alkyl and —H, R$^8$ is alkyl; and
wherein R$^5$ is selected from the group consisting of —Cl, —Br, —F, —H and alkyl of 1–4 carbon atoms;
and at least 0.1 mole percent of a polymer of a monomer having the formula

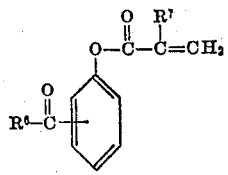

wherein

R⁶ is selected from the group consisting of methyl and phenyl, and
R⁷ is selected from the group consisting of methyl and —H;

characterized by its insolubility in a solvent in which the first homopolymer, prior to cross-linking, was soluble.

3. A cross-linked polymeric composition as in claim 2 wherein at least one polar vinylidene monomer is vinyl acetate and the solvent is benzene.

4. A cross-linked polymeric composition as in claim 2 wherein at least one polar vinylidene monomer is acrylonitrile and the solvent is dimethyl sulfoxide.

5. A cross-linked polymeric composition as in claim 2 wherein at least one polar vinylidene monomer is vinylidene chloride and the solvent is tetrahydrofuran.

6. A cross-linked polymeric composition as in claim 2 wherein at least one polar vinylidene monomer is methyl acrylate and the solvent is benzene.

7. A cross-linked polymeric composition as in claim 2 wherein at least one polar vinylidene monomer is vinyl chloride and the solvent is dioxane.

8. A shaped article of the cross-linked polymeric composition of claim 2.

9. A film of the cross-linked polymeric composition of claim 2.

10. The polymeric composition of claim 1 to which is grafted a monomer having the formula

wherein $R^1$ and $R^2$ represent the same grouping as in claim 1.

11. The polymeric composition of claim 2 to which is grafted a monomer having the formula

wherein $R^1$ and $R^5$ represent the same grouping as in claim 2.

References Cited by the Examiner
UNITED STATES PATENTS

| | | | |
|---|---|---|---|
| 2,484,529 | 10/1949 | Roedel | 204—158 |
| 2,902,420 | 9/1959 | Norrish | 204—158 |
| 2,938,883 | 5/1960 | Raich | 260—63 X |
| 2,986,507 | 5/1961 | Steck | 204—158 |

MURRAY TILLMAN, *Primary Examiner.*

J. T. GOLLKASIAN, *Assistant Examiner.*

UNITED STATES PATENT OFFICE
CERTIFICATE OF CORRECTION

Patent No. 3,265,772                 August 9, 1966

Stanley Tocker

It is hereby certified that error appears in the above numbered patent requiring correction and that the said Letters Patent should read as corrected below.

Column 8, lines 19 and 66, for "polymer", each occurrence, read -- homopolymer --; column 8, line 36 and column 9, line 7, for "homopolymer", each occurrence, read -- polymer --.

Signed and sealed this 1st day of August 1967.

(SEAL)
Attest:

EDWARD M. FLETCHER, JR.             EDWARD J. BRENNER
Attesting Officer                    Commissioner of Patents